United States Patent
Calagui

(12) 
(10) Patent No.: US 6,263,781 B1
(45) Date of Patent: Jul. 24, 2001

(54) CUP RECEPTACLE WITH FILTER INSERT AND ITS ASSOCIATED METHOD OF USE

(76) Inventor: Juanito B. Calagui, P.O. Box 325, Passaic, NJ (US) 07055

( * ) Notice: Subject to any disclaimer, the term of this patent is extended or adjusted under 35 U.S.C. 154(b) by 0 days.

(21) Appl. No.: 09/543,793

(22) Filed: Apr. 6, 2000

(51) Int. Cl.[7] .............................. A47J 31/00; B01D 24/22

(52) U.S. Cl. ................................ 99/323; 99/279; 99/322; 99/323.3; 210/474; 210/477

(58) Field of Search .............................. 99/323, 322, 279, 99/319, 323.3; 220/713, 718, 716, 719; 210/474, 477; 219/689

(56) References Cited

U.S. PATENT DOCUMENTS

| | | | |
|---|---|---|---|
| 4,938,375 | * | 7/1990 | Fantacone .............................. 220/713 |
| 4,999,109 | * | 3/1991 | Sabre ................................ 210/474 X |
| 5,168,140 | * | 12/1992 | Welker .................................. 219/689 |

FOREIGN PATENT DOCUMENTS

2174890 * 11/1986 (GB) ....................................... 99/323

* cited by examiner

Primary Examiner—Reginald L. Alexander
(74) Attorney, Agent, or Firm—Weingram & Associates, PC

(57) ABSTRACT

A method and assembly is provided to mix solids with a liquid in the preparation of a beverage. The assembly includes a disposable cup receptacle with an open top end. On the interior of the cup receptacle a ridge is positioned a predetermined distance below the open top end. A solid beverage flavorant, such as coffee or tea is placed in the cup receptacle. A disposable filter insert is positionable within the cup receptacle and contains a filter screen that is water permeable, yet blocks the solid beverage flavorant. The filter insert is placed into the cup receptacle after the solid beverage flavorant has been added to the cup receptacle. The filter insert is configured to engage the ridge of the interior of the cup receptacle, thereby retaining the filter insert in place over the solid beverage flavorant. Water is then poured into the cup receptacle through the filter insert. The water mixes with the solid beverage flavorant and produces the desired beverage. The filter insert prevents residual solids from being consumed with the beverage.

16 Claims, 3 Drawing Sheets

CUP RECEPTACLE WITH FILTER INSERT AND ITS ASSOCIATED METHOD OF USE

BACKGROUND OF THE INVENTION

1. Field of the Invention

The present invention relates to disposable hot beverage containers, such as coffee cups and tea cups. More particularly, the present invention relates to hot beverage containers that contain filter elements that trap solids within the container yet enable fluid to flow freely from the container.

2. Description of the Prior Art

Many people enjoy drinking tea or coffee. However, most types of tea and coffee must be brewed. In the case of tea, dried tea leaves are steeped in hot water. The tea leaves flavor the water to produce tea. In the case of coffee, hot water is filtered through ground coffee beans, wherein the coffee beans flavor the water. After the brewing process, the residual tea leaves or coffee grounds are removed, thereby leaving the consumable beverage. The residual tea leaves and coffee grounds are removed because the presence of these solid by-products in a beverage ruins the consistency of the beverage and is undesirable to many people. Digestion of tea leaves and coffee grounds is problematic for the consumer. Furthermore, tea leaves or coffee ground are commonly bitter if consumed. Thus, if consumed with the beverage, the tea leaves or coffee grounds can ruin the flavor of the beverage and harm the digestive system.

Tea and coffee have been consumed as a beverage for thousands of years. As a result, the prior art is replete with various devices used to brew tea and coffee. For the past century, coffee beans typically have been prepared in some type of coffee pot. Within the coffee pot, ground coffee beans are typically placed in a metal strainer or a paper filter. Hot water is then either percolated or poured through the ground coffee beans. After the coffee is brewed, the grounds remaining in the strainer or filter are removed, thereby leaving only the beverage for consumption. Such a brewing process is time consuming and requires a coffee pot. If a person desires an "instant" cup of coffee that can be prepared in a cup with hot water, a person cannot used fresh ground coffee. Rather, a person must purchase highly processed coffee that is specifically designed to dissolve instantly in water. However, many people believe that processed coffee lacks the complexity of flavor that fresh ground coffee has. As such, flavor is sacrificed for convenience.

In the brewing of tea or other herbs, tea leaves are typically immersed in hot water and allowed to steep for a period of time. After the tea has steeped, the tea leaves are removed from the beverage. Commonly, tea leaves are packaged in filter bags that can be immersed in hot water. As such, the filter bag can be easily removed from a cup of hot water after the tea leaves have steeped for a period of time. Prior to the invention of disposable paper tea bags, tea balls were commonly utilized. A tea ball is a hollow perforated metal ball that holds a quantity of tea leaves. The tea ball is immersed in a cup or pot of hot water. After a period of time, the tea ball can be removed, thereby removing the tea leaves from the beverage.

Processed coffees and teas come only in a small number of varieties. More and more, people desire more variety than is presented to them at the supermarket. As a result, more people are buying exotic blends of teas and coffee in bulk. The problem associated with the bulk purchase of teas and coffees is that the coffee must be made in a coffee pot and the tea must be placed in a tea ball or filter. Such processing of the tea and coffee is time consuming, inconvenient to many and prevents the portability of the beverage being prepared.

As a result of the above, a need exits for a product that would enable bulk ground coffee or bulk tea leaves to be prepared into a beverage as quickly and as easily as a processed instant coffee and a tea bag. This need is met by the present invention as it is described and claimed below.

SUMMARY OF THE INVENTION

The present invention is an assembly and corresponding method to mix solids with a liquid in the preparation of a beverage. The assembly includes a disposable cup receptacle. The cup receptacle has an open top end. On the interior of the cup receptacle is a ridge positioned a predetermined distance below the open top end. A solid beverage flavorant, such as coffee or tea or herbal product is placed in the cup receptacle.

A disposable filter insert is provided that is positionable within the cup receptacle. The filter insert contains a filter screen that is water permeable, yet blocks the solid beverage flavorant. The filter insert is placed into the cup receptacle after the solid beverage flavorant has been added to the cup receptacle. The filter insert is configured to engage the ridge of the interior of the cup receptacle, thereby locking the filter insert into place over the solid beverage flavorant. The filter insert remains positioned regardless of the angle the cup is tilted throughout. Water is then poured into the cup receptacle through the filter insert. Alternatively, the filter insert can be locked into position after the water and flavorant are deposited into the cup. The water mixes with the solid beverage flavorant and produces the desired beverage. The beverage can then be consumed directly from the assembly. The filter insert prevents residual solids from being consumed with the beverage. After the beverage is consumed, the entire assembly can be thrown away.

BRIEF DESCRIPTION OF THE DRAWINGS

For a more complete understanding of the present invention, reference is made to the following description of an exemplary embodiment thereof, considered in conjunction with the accompanying drawings, of which.

DETAILED DESCRIPTION OF THE PREFERRED EMBODIMENTS

Although the present invention system can be used to filter particulate matter from most any liquid, it is especially well suited for separating tea leaves from tea. Accordingly, the present invention will be described in an application where the present invention system is used to segregate tea leaves from liquid tea. Such an exemplary embodiment is used in order to set forth the best mode contemplated for the invention.

Figure 1:
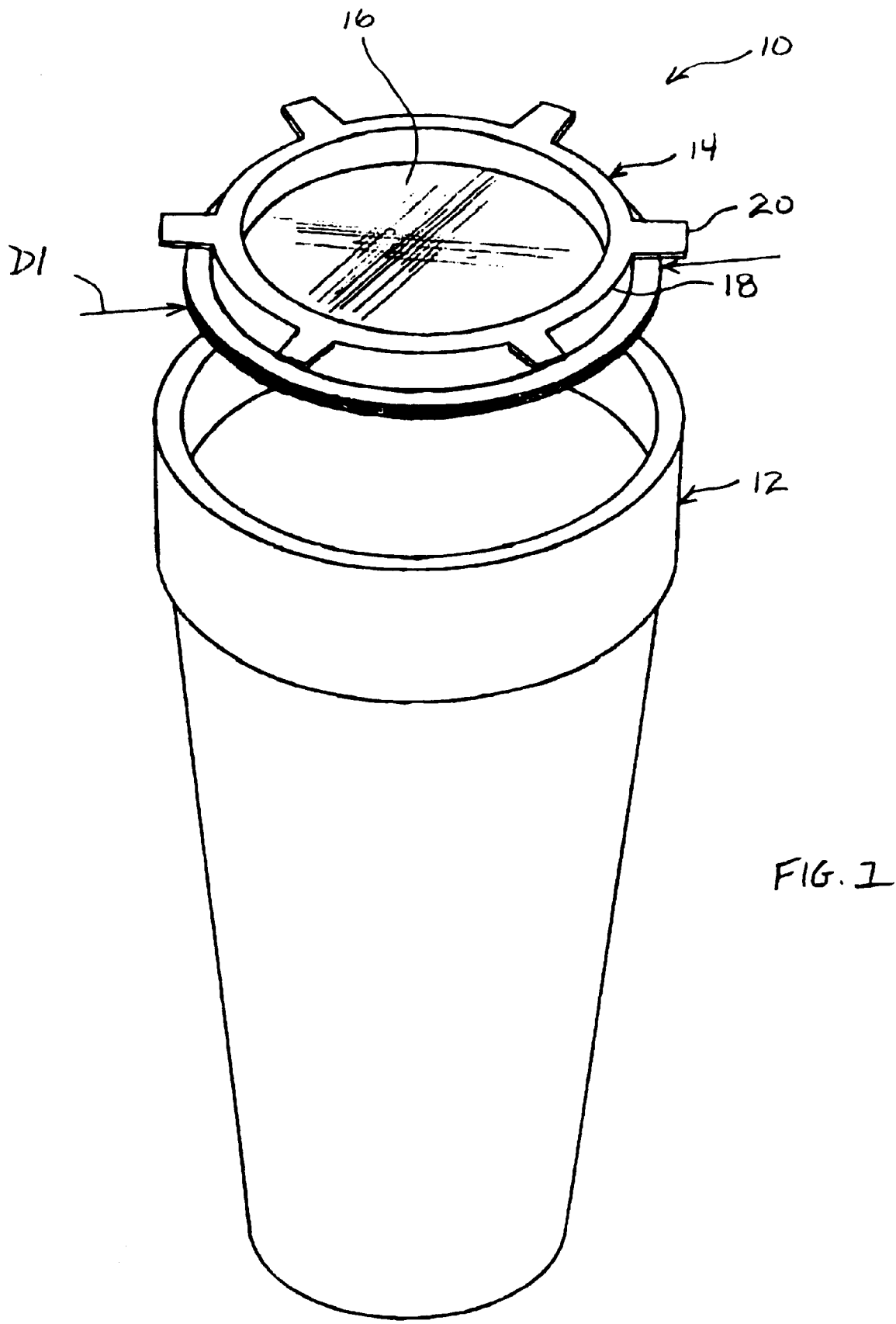
FIG. 1 is an exploded perspective view of a cup and filter insert in accordance with the present invention.

Referring to FIG. 1, an assembly 10 in accordance with the present invention is shown. The assembly 10 is comprised of a cup receptacle 12 and a filter insert 14. The cup receptacle 12 can be manufactured from any material used to produce cups. However, the assembly 10 is intended to be both low cost and disposable. Accordingly, the cup receptacle 12 is preferably made from polystyrene, plastic or a wax coated paperboard, as are other disposable hot beverage cups.

The filter insert 14 fits into the cup receptacle 12. The filter insert 14 includes a filter screen 16. The filter screen 16 is water permeable and is paper based so as to be low cost. Such paper based filter material is commonly used in the prior art production of disposable coffee filters and tea bags. The filter screen 16 can also be constructed from plastics to withstand especially hot beverages and being dissolved. The filter screen 16 has a first diameter D1. As will later be shown, the diameter D1 of the filter screen 16 matches the internal diameter of a section of the cup receptacle 12. As a result, the filter screen 16 completely occludes the cup receptacle 12 at some point in the cup receptacle 12.

The filter screen 16 is attached to a support element 18. The support element 18 reinforces the filter screen 16 and maintains the filter screen 16 in a flat circular orientation as fluid flows through the filter screen 16. The support element 18 is annular in shape. As such, the support element 18 provides support to the filter screen 16 around its entire periphery without significantly obstructing the ability of liquid to flow through the filter screen 16. The support element 18 is preferably molded of an inexpensive plastic, thereby adding to the low cost and disposability of the overall assembly 10.

A plurality of finger tabs 20 radially extend from the top of the support element 18. The finger tabs 20 are used to engage the cup receptacle 12 and maintain the filter insert 14 in place within the cup receptacle 12, in the manner described below.

Figure 2:
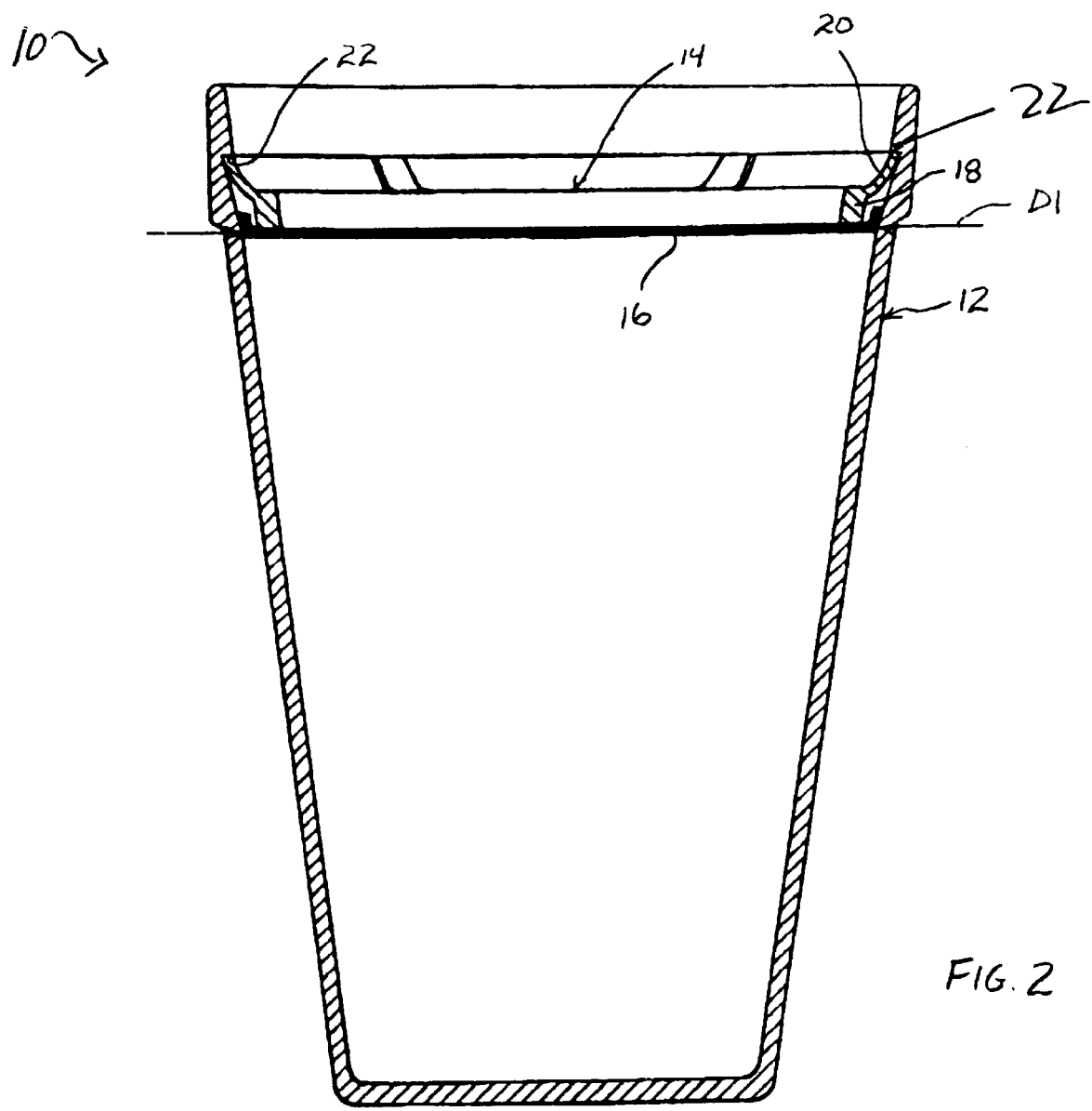
FIG. 2 is a cross-sectional view of the embodiment of the present invention shown in FIG. 1 with the insert mounted to the cup.

Referring to FIG. 2, it can be seen that the finger tabs 20 not only radially extend away from the support element 18 of the filter insert 14, the finger tabs 20 also extend upwardly above the support element 18. In the cup receptacle 12, a ridge 22 is formed on the interior of the cup receptacle 12 a predetermined distance below the open top edge of the cup receptacle 12. For a reason that will later be explained, the predetermined distance between the ridge 22 and the top of the cup receptacle 12 is preferably between from one eighth of an inch to one inch.

When the filter insert 14 is inserted into the cup receptacle 12, the finger tabs 20 become slightly bent by the interior of the cup receptacle 12. The material of the finger tabs 20 provides the tabs 20 with flexibility. The tabs 20 are also given a slight arcuate or concave shape to resist being dislodged when the beverage impacts the filter 16. As the finger tabs 20 reach the level of the ridge 22 inside the cup receptacle 12, the finger tabs 20 expand outwardly and engage the ridge 22. The finger tabs 20 in the ridge 22 secure and retain the filter insert 14 in place and prevent the filter insert 14 from being moved out of the cup receptacle 12.

The cup receptacle 12 and the filter insert 14 are sized and shaped so that when the finger tabs 20 engage the ridge 22 in the cup receptacle 12, the diameter D1 of the filter screen 16 matches the diameter of the interior of the cup receptacle 12 around the filter screen 16. As such, the filter screen 16 completely occludes the cup receptacle 12 and nothing can enter or exit the cup receptacle 12 past the filter insert 14 without first flowing through the filter screen 16.

Figure 3:
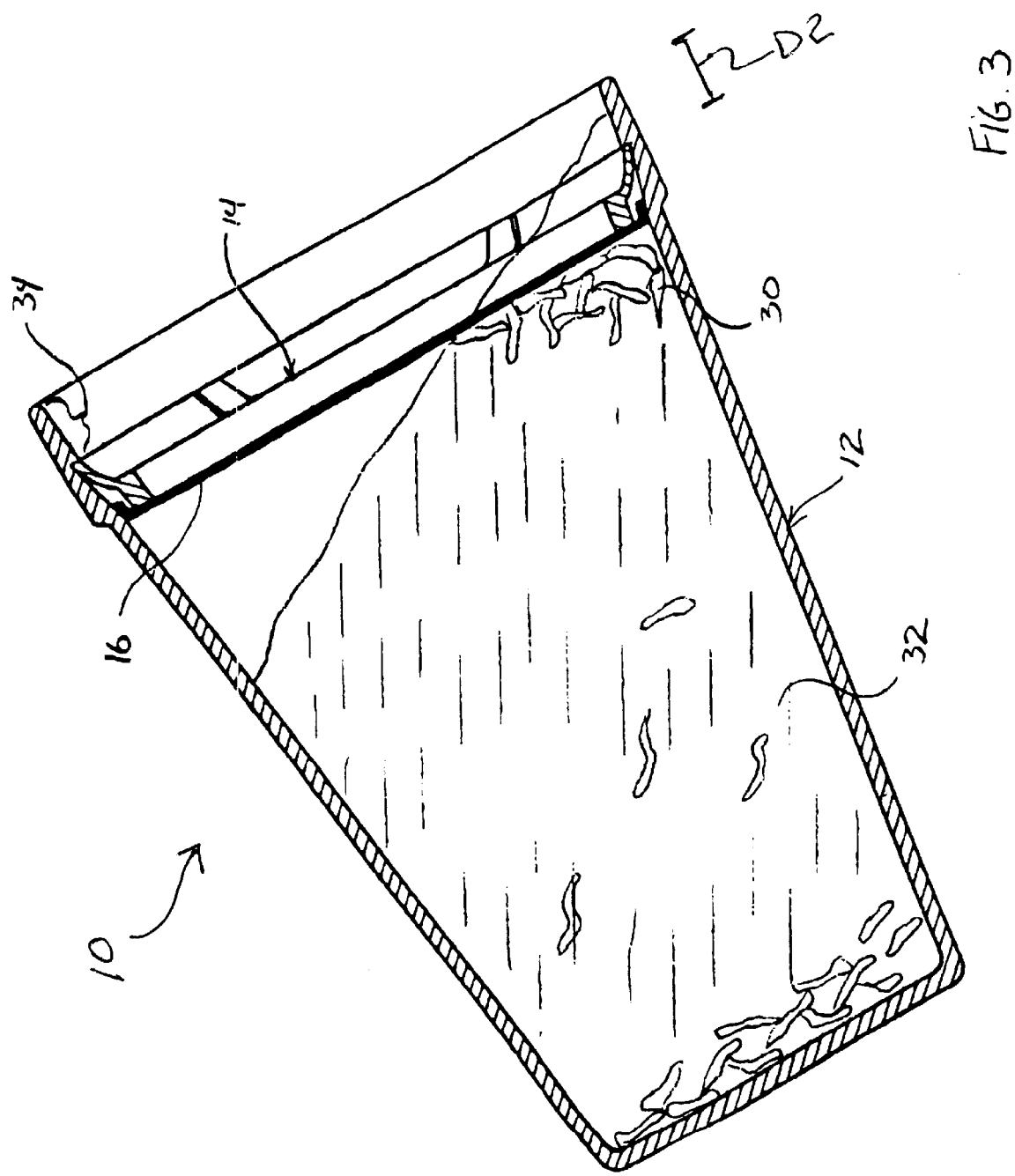
FIG. 3 is a cross-sectional view of the embodiment of the 15 present invention shown pouring tea.

Referring to FIG. 3, it will be understood that to utilize the present invention assembly 10, a person first takes the cup receptacle 12 and places a volume of bulk tea leaves 30 into the cup receptacle 12. Once the tea leaves 30 are in the cup receptacle 12, the filter insert 14 is set into the cup receptacle 12, wherein the filter insert 14 locks into place. Hot water can then be poured through the filter insert 14 into the cup receptacle 12. The hot water mixes with the tea leaves 30 and produces a tea beverage 32. The tea beverage 32 can then be consumed directly through the filter insert 14. Alternatively, the filter insert 14 can be locked into place after the leaves 30 and hot water are placed into the receptacle 12.

As can be seen from FIG. 3, the filter insert 14 engages the interior of the cup receptacle 12 a predetermined distance D2 from the open top edge of the cup receptacle 12. As such, the cup receptacle 12 maintains a lip area 34 that remains unaffected by the presence of the filter insert 14. The presence of the lip area 34 enables a person to sip from the cup receptacle 12 in a manner similar to a person sipping from a traditional cup without a filter insert.

As a person tips the cup receptacle 12 to take a drink, the beverage 32 in the cup receptacle 12 flows through the filter insert 14. The filter screen 16 in the filter insert 14 permits only liquid to pass out of the cup receptacle 12. The tea leaves 30 become trapped by the filter screen 16 and remain in the cup receptacle 12. Once the tea beverage 32 is consumed, the assembly 10 can be discarded with the used tea leaves 30.

If the tea leaf flavor is not exhausted, more hot water can be poured through the filter screen 16 for another cup of the flavored beverage 32.

Since the cup receptacle 12 and the filter insert 12 are made of inexpensive materials, the assembly 10 can be sold at a low cost and can be considered disposable. Consequently, a person can make and drink tea from bulk tea leaves in a manner just as simple and just as inexpensively as a person using conventional tea bags.

In the example described, the assembly was used to filter tea leaves from tea. However, it will be understood that ground coffee beans, herbs, pharmaceutical preparations, beverage concentrates and other compounds can be substituted for the tea leaves. As such, the present invention assembly 10 enables a person to mix a solid with a liquid and thereafter drain the liquid without contamination from undissolved solid particulate. The present invention assembly therefore enables a cup of coffee to be prepared from fresh ground coffee beans with the same degree of convenience as those who use processed instant coffee.

The present invention can also be sold individually or in packs, with the solid flavorant pre-disposed inside the cup with the filter in place and through which a liquid is poured to provide the flavored beverage.

It will be understood that the specifics of the present invention described above illustrate exemplary embodiments of the present invention. A person skilled in the art can therefore make numerous alterations and modifications to the shown embodiment utilizing functionally equivalent components to those shown and described, without departing from the scope of the invention. For example, the shape and volume of the cup receptacle can be varied. Furthermore, the appearance of the filter insert and the cup receptacle can also be varied to most any diameter desired. All such modifications are intended to be included within the scope of the present invention as defined by the appended claims.

What is claimed is:

1. An assembly, comprising
   a receptacle having an interior surface and an open top end, said receptacle capable of retaining a volume of a fluid and having side walls tapering inwardly from said open top end, said receptacle having an inwardly projecting ridge disposed on said interior surface a predetermined distance below said open top end;

a filter element positionable within said receptacle below said ridge, said filter element containing a filter screen that is water permeable, a peripheral support secured to said screen, and resilient projections extending outwardly from said support and engaging said ridge, wherein said ridge retains said filter element so as to occlude the receptacle with said filter screen.

2. The assembly according to claim 1, wherein said filter support projections include finger tabs that engage said ridge when said filter element is inserted into said receptacle to said predetermined distance below said open top end.

3. The assembly according to claim 1, wherein said predetermined distance between said ridge and said open top end of said receptacle is between one eighth inch and one inch.

4. The assembly according to claim 1, wherein said receptacle is a cup fabricated from a material selected from a group consisting of polystyrene compounds, plastic and coated paperboard.

5. The assembly according to claim 1, wherein said filter element support reinforces said filter screen.

6. The assembly according to claim 5, wherein said support is annular in shape.

7. The assembly according to claim 6, wherein said filter screen is selected from a group consisting of paper based products and polymer based products.

8. The assembly according to claim 1, wherein said filter support projections include locking fingers extending therefrom that engage said ridge in said receptacle and lock said filter element in place, thereby preventing said filter element from being retracted out of said open top end of said receptacle.

9. An assembly, comprising:

a cup having an open top and a ridge on an interior surface a predetermined distance below said open top;

a filter positionable within said cup, said filter having locking fingers extending therefrom to engage said ridge and retain said filter in place at a fixed orientation within said cup thereby preventing said filter from being displaced from said open top.

10. The assembly according to claim 9, wherein said filter completely obstructs said cup when retained at said fixed orientation.

11. The assembly according to claim 9, wherein said filter is liquid permeable.

12. The assembly according to claim 9, wherein said predetermined distance between said ridge and said open end of said cup is from one eighth of an inch to one inch.

13. The assembly according to claim 9, wherein said cup is fabricated from a material selected from a group consisting of polystyrene compounds, plastic and coated paperboard.

14. The assembly according to claim 9, wherein said filter is selected from the group consisting of a paper based filter screen and a plastic based filter screen, said filter including a support to reinforce said filter screen.

15. The assembly according to claim 9, wherein said locking fingers are flexible.

16. The assembly according to claim 9, wherein the cup comprises:

a sidewall being tapered to prevent the filter from falling to contact a bottom of the cup.

* * * * *